US008157889B2

United States Patent
Tohji

(10) Patent No.: US 8,157,889 B2
(45) Date of Patent: Apr. 17, 2012

(54) MAGNETIC METAL POWDER AND METHOD OF PRODUCING THE POWDER

(75) Inventor: Kazuyuki Tohji, Sendai (JP)

(73) Assignee: Dowa Electronics Materials Co., Ltd., Tokyo (JP)

(*) Notice: Subject to any disclaimer, the term of this patent is extended or adjusted under 35 U.S.C. 154(b) by 768 days.

(21) Appl. No.: 12/292,063

(22) Filed: Nov. 12, 2008

(65) Prior Publication Data

US 2011/0005353 A1    Jan. 13, 2011

Related U.S. Application Data

(60) Division of application No. 12/285,857, filed on Oct. 15, 2008, now abandoned, which is a continuation of application No. 10/812,078, filed on Mar. 30, 2004, now abandoned.

(30) Foreign Application Priority Data

Sep. 9, 2003 (JP) ................................. 2003-317307

(51) Int. Cl.
    *B22F 9/18* (2006.01)
(52) U.S. Cl. ................ 75/710; 75/348; 75/351; 75/363; 75/370; 75/414
(58) Field of Classification Search .................. None
    See application file for complete search history.

(56) References Cited

U.S. PATENT DOCUMENTS

| 6,254,662 | B1 | 7/2001 | Murray et al. |
| 6,302,940 | B2 | 10/2001 | Murray et al. |
| 6,331,364 | B1 | 12/2001 | Baglin et al. |

(Continued)

FOREIGN PATENT DOCUMENTS

JP    2000-54012    2/2000

(Continued)

OTHER PUBLICATIONS

B. Jeyadevan et al., "Direct Synthesis of fct-FePt Nanoparticles by Chemical Route" Japanese Journal of Applied Physics; vol. 42, No. 4a, Apr. 1, 2003.

(Continued)

*Primary Examiner* — John Sheehan
(74) *Attorney, Agent, or Firm* — Clark & Brody

(57) ABSTRACT

A magnetic metal powder having fluidity is provided which is composed of FePt nanoparticles synthesized by the polyol synthesis method that possess fct (face-centered tetragonal) structure and exhibit crystal magnetic anisotropy from immediately after synthesis. Specifically, there is provided a magnetic metal powder having fluidity which is composed of magnetic metal particles whose main components and the contents thereof are represented by the following general formula (1):

$$[T_X M_{1-X}]_Y Z_{1-Y} \qquad (1),$$

where T is one or both of Fe and Co, M is one or both of Pt and Pd, Z is at least one member selected from the group composed of Ag, Cu, Bi, Sb, Pb and Sn, X represents 0.3~0.7, and Y represents 0.7~1.0, the balance being impurities unavoidably incorporated during production, which magnetic metal powder has a volumetric ratio of ferromagnetic structure (face-centered tetragonal ratio) as measured by Mossbauer spectroscopy in the range of 10~100%, saturation magnetization σs of 20 emu/g or greater, and average primary particle diameter by transmission electron microscopic observation (TEM) of 30 nm or less.

7 Claims, 4 Drawing Sheets

U.S. PATENT DOCUMENTS

| | | |
|---|---|---|
| 6,875,253 B2 | 4/2005 | Daimon et al. |
| 2003/0121364 A1 | 7/2003 | Sun |
| 2004/0074336 A1 | 4/2004 | Daimon et al. |
| 2005/0022910 A1* | 2/2005 | Sato .............................. 148/306 |
| 2006/0027042 A1* | 2/2006 | Sato ................................ 75/255 |
| 2006/0032330 A1* | 2/2006 | Sato ................................ 75/371 |

FOREIGN PATENT DOCUMENTS

| | | |
|---|---|---|
| WO | WO 02/062509 | 8/2002 |

OTHER PUBLICATIONS

E. Carpenter, et al., "Magnetic properties of iron and iron platinum alloys synthesized via microemulsion techniques", Journal of Applied Physics; vol. 87, No. 9, May 1, 2000.

Y. Hosoe, et al., "Low-Noise Characteristics and Thermal Stability of Thin-Film Media", *Journal of Magnetics Society of Japan*, vol. 22, No. 12, 1998, pp. 1448-1502.

Denshi Zairyo (Electronic Materials), Jan. 2002, pp. 61-67.

\* cited by examiner

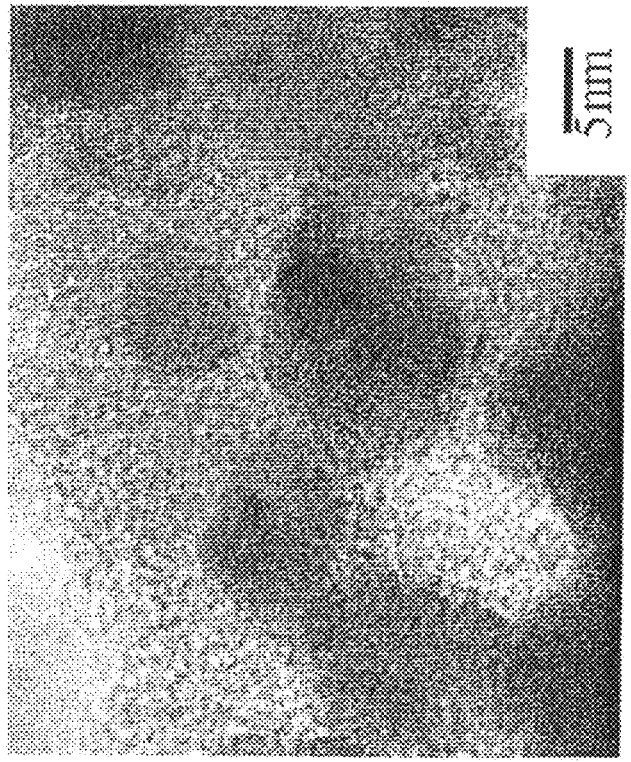
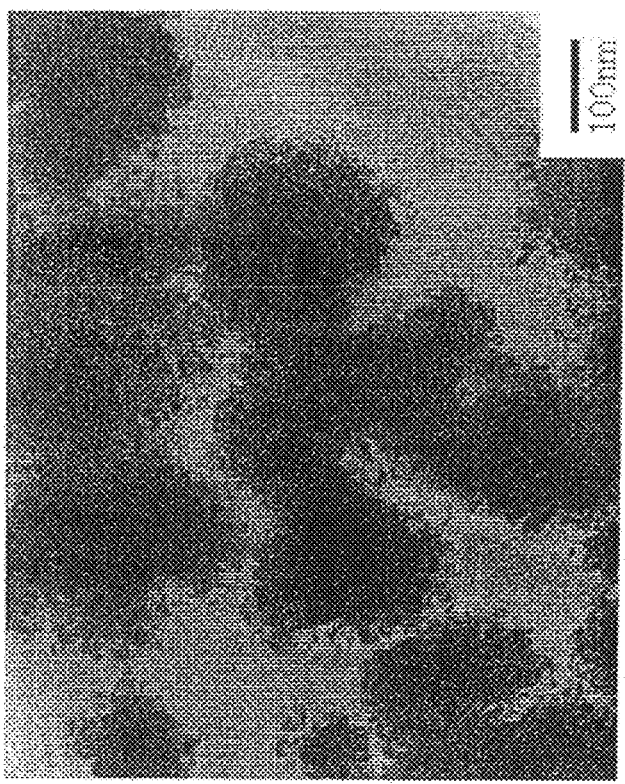
Fig. 1
(A) Primary Particles
(B) Secondary Particles

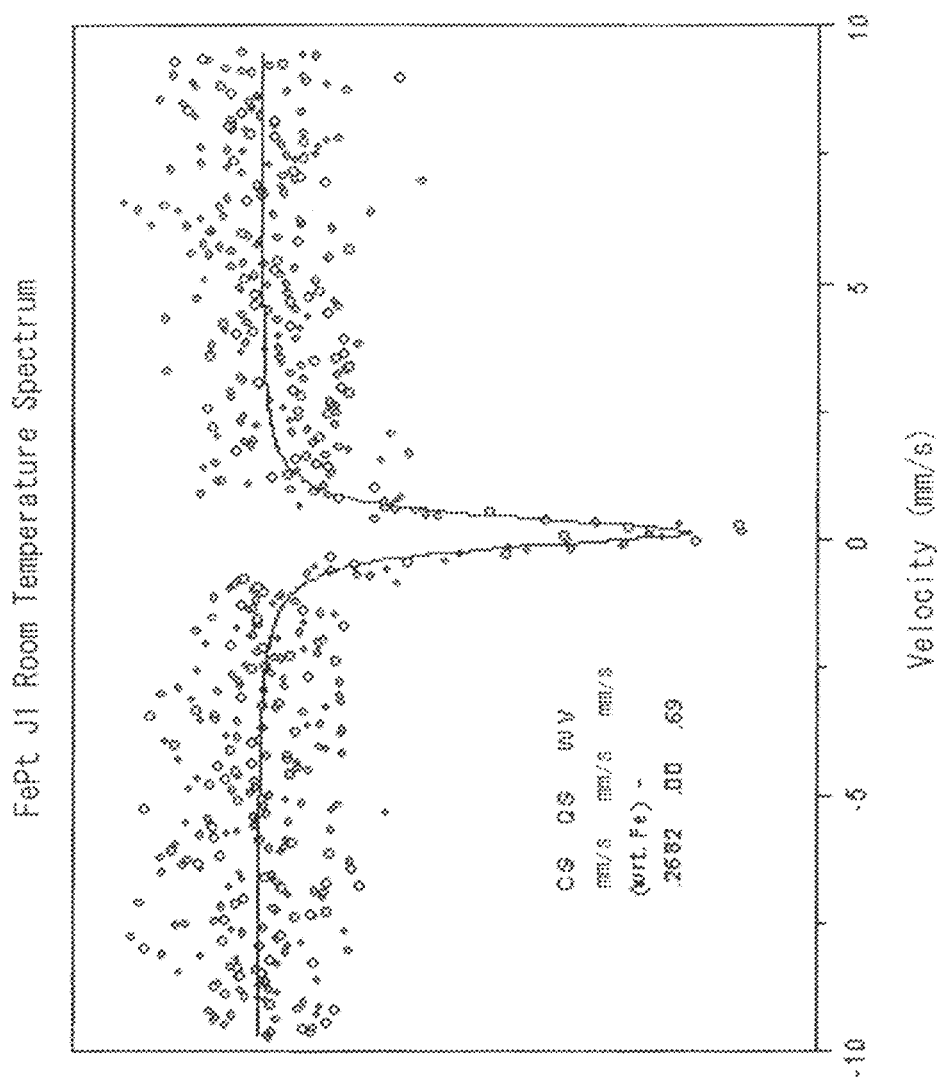

MAGNETIC METAL POWDER AND METHOD OF PRODUCING THE POWDER

CROSS REFERENCE TO RELATED APPLICATION

This application is a divisional of U.S. application Ser. No. 12/285,857 filed Oct. 15, 2008 now abandoned, which is a continuation of U.S. application Ser. No. 10/812,078 filed Mar. 30, 2004 now abandoned.

BACKGROUND OF THE INVENTION

1. Field of the Invention

This invention relates to a magnetic metal powder that can be used in high-density magnetic recording media, nanoscale electronics, permanent magnet materials, biomolecular labeling agents, drug carriers and the like and to a method of producing the magnetic metal powder. Although, strictly speaking, the magnetic metal powder of the present invention is composed of metal particles characterized by general formula (1) discussed later, owing to the fact that it is typically an FePt-system alloy in which T=Fe, M=Pt, the particles of the magnetic metal powder are referred to in this specification simply by the terms "FePt particles" and "FePt nanoparticles" as being representative of such magnetic metal particles.

2. Background Art

In order to increase the recording density of a high-density magnetic recording medium, it is necessary to reduce the size of the basic unit for recording. However, conventional media using sputter-formed films are approaching the limit to which recording density can be increased because of problems in such areas as thermal fluctuation, grain refining and variance of crystal grain size. Recently, therefore, attention has focused on FePt-system magnetic metal nanoparticles as a high-density magnetic recording medium material that is not susceptible to thermal fluctuation, has high anisotropy, and exhibits strong coercivity.

Japanese Patent No. 3258295 (JPA No. 2000-54012; herein after called Reference 1) teaches a method of producing such magnetic metal nanoparticles, namely a method producing FePt alloy particles in a monodispersed state by conducting thermal decomposition reaction of iron pentacarbonyl simultaneously with reduction of platinum (II) acetylacetonate by the action of polyol. On the other hand, in Journal of Applied Physics, Vol. 87, No. 9, 1 May 2000, p. 5615-5617 (Reference 2), a method of reducing metal ions using boron hydride is reported in which the reaction site is a W/O (water/oil) type reversed micelle utilizing an octane oil phase and CTAB (cetyl trimethyl ammonium bromide) as surface active agent.

The crystal structure of the FePt particles obtained by these methods is a disordered fcc (face-centered cubic) structure, so that the particles exhibit superparamagnetism on the nano order. If they are to be used as ferromagnetic particles, therefore, it is necessary to carry out heat treatment for transforming the crystal structure to an $L1_0$ ordered phase that is fct (face-centered tetragonal) phase.

The heat treatment has to be conducted at or above the crystal structure transition temperature (Tt) between the disordered phase and ordered phase and is ordinarily conducted at a high temperature of 450° C. or higher. At the time of this heat treatment, the granularity distribution broadens owing to grain enlargement caused by heat-induced coalescence among the particles. As a result, the particles come to be present in a mixture of single domain and multi-domain structures that makes them unsuitable for a high-density magnetic recording media. Therefore, in order to obtain FePt particles having ferromagnetism while maintaining their grain diameter immediately after synthesis, it is effective to coat the particles with a protective agent for preventing inter-particle coalescence or to lower Tt by some method so that the heat treatment can be conducted at a low temperature.

Denshi Zairyo (Electronic Materials) Jan. 2002, p 61-67 (Reference 3) reports that addition of elements such as Ag, Cu, Sb, Bi and Pb during synthesis of FePt particles by the polyol method makes it possible to lower the crystal structure transition temperature (Tt) between fcc structure and fct structure.

The FePt particles obtained by the methods of References 1-3 have a nonmagnetic fcc (face-centered cubic) structure immediately following the reaction and cannot be used unmodified as magnetic particles for a magnetic recording medium. This makes it necessary to subject them to heat treatment at a temperature equal to or higher than the fct crystal structure transition temperature (Tt) so as to transform them to an fct (face-centered tetragonal) structure exhibiting magnetism.

The crystal structure transition temperature of the FePt particles obtained by these methods is around 450° C., so that heat treatment at a temperature of 450° C. or higher is required for transition to the fct structure. However, when the aggregate (powder) composed of these FePt particles is heated to a temperature of 450° C. or higher, the metal particles enlarge through coalescence. Therefore, even though an fct structure can be obtained, the FePt particles do not assume a nanoparticle morphology suitable for use in a high-density recording medium, and since particle coalescence is usually not uniform, there arises a grain distribution that broadens the range of magnetic characteristic distribution to pose problems from the practical viewpoint.

In order to prevent particle enlargement by heat-induced inter-particle coalescence, the heat treatment must be carried out in a state with the position of the individual particles fixed at prescribed spacing (with the particles fixed at prescribed locations on a substrate, for example). However, realization of such heat treatment requires use of a sophisticated technology for precisely positioning the particles in an orderly fashion. While this may be technically feasible, a still better solution would be for the FePt particles to possess fct structure from immediately after synthesis, because this would offer the considerable merit of eliminating the need for such heat treatment or at least simplify it (by enabling use of a low heat treatment temperature, for example).

Although it has been reported that the Tt temperature is lowered by the effect of elements added to the FePt alloy, the need for heat treatment after reaction still remains, namely a heat treatment temperature of at least 300° C. is required for transition to fct structure, which limits the materials that can be used for the substrate/base and causes a number of other inconveniences. Moreover, in the case where FePt particles of fcc structure are transformed to fct structure by heat treatment conducted after the particles are positioned on a substrate, the particles assume uniaxial crystal magnetic anisotropy during the heat treatment process. The direction of this axis is random when viewed with respect to the substrate, for example. Alignment of the axis in a certain direction with respect to the substrate requires the heat treatment and the like to be carried out in a magnetic field. This is difficult in actual practice. Owing to the fact that particles heat treated on a substrate are adhered to the substrate by sintering or the like, it is extremely difficult to rearrange them as powder on another substrate or base. On the other hand, if the particles should have uniaxial crystal magnetic anisotropy from the start and should further be in the state of a powder enabling the particles to flow freely, it would be easily possible to disperse the particles in resin and uniaxially align them with respect to a substrate at normal temperature by applying a conventional technology used for drying a coating-type magnetic recording medium.

SUMMARY OF THE INVENTION

An object of the present invention is therefore to provide a magnetic metal powder whose particles have fct structure from immediately after being obtained by a reaction and therefore can be obtained as magnetic metal powder having fluidity that eliminates or mitigates the need for heat treatment.

The inventor succeeded in obtaining a magnetic metal powder composed of nanoparticles having fct structure at the time of completion of synthesis reaction.

Specifically, I accomplished the present invention, which provides a magnetic metal powder having fluidity which is composed of magnetic metal particles whose main components and the contents thereof are represented by the following general formula (1):

$$[T_X M_{1-X}]_Y Z_{1-Y} \quad (1),$$

where T is one or both of Fe and Co, M is one or both of Pt and Pd, Z is at least one member selected from the group composed of Ag, Cu, Bi, Sb, Pb and Sn, X represents 0.3~0.7, and Y represents 0.7~1.0, the balance being impurities unavoidably incorporated during production, which magnetic metal powder has a volumetric ratio of ferromagnetic structure (face-centered tetragonal ratio) as measured by Mossbauer spectroscopy in the range of 10~100%, saturation magnetization σs of 20 emu/g or greater, and average primary particle diameter by transmission electron microscopic observation (TEM) of 30 nm or less. The magnetic metal powder according to the present invention preferably has a magnetic anisotropy Hk by magnetic torque measurement of 10 kOe or greater, more preferably 12.4 kOe or greater and preferably has an average primary particle diameter of 20 nm or less, more preferably 10 nm or less.

The present invention also provides a method of producing a magnetic metal powder comprising a step of producing a magnetic metal powder composed of magnetic metal particles of a substance represented by the following general formula (1):

$$[T_X M_{1-X}]_Y Z_{1-Y} \quad (1),$$

where T is one or both of Fe and Co, M is one or both of Pt and Pd, Z is at least one member selected from the group composed of Ag, Cu, Bi, Sb, Pb and Sn, X represents 0.3~0.7, and Y represents 0.7~1.0, the balance being impurities unavoidably incorporated during production, in which step metal salts containing the T and M components and if required the Z component are dissolved in a solvent composed of a polyalcohol or a derivative of a polyalcohol and having a boiling point of 270° C. or higher, holding the solution at a temperature of 270° C. or higher to reduce the metal salts with the polyalcohol or polyalcohol derivative and synthesize particles of the substance by the reduction, at which time the particles synthesized by the reduction, in their state as synthesized, have a volumetric ratio of ferromagnetic structure (face-centered tetragonal ratio) as measured by Mossbauer spectroscopy in the range of 10~100%, saturation magnetization as of 20 emu/g or greater, and average primary particle diameter by transmission electron microscopic (TEM) observation of 30 nm or less.

The polyalcohol can be one or both of triethylene glycol and tetraethylene glycol and the salts of the T, M and Z components can be acetylacetonates of these components.

BRIEF DESCRIPTION OF THE DRAWINGS

FIG. 1 shows transmission electron micrographs of primary and secondary particles of a magnetic metal powder in accordance with the present invention.

FIG. 4 shows an example of the results of Mossbauer spectroscopy carried out on a magnetic metal powder of a comparative example.

DESCRIPTION OF THE PREFERRED EMBODIMENTS

Figure 2:
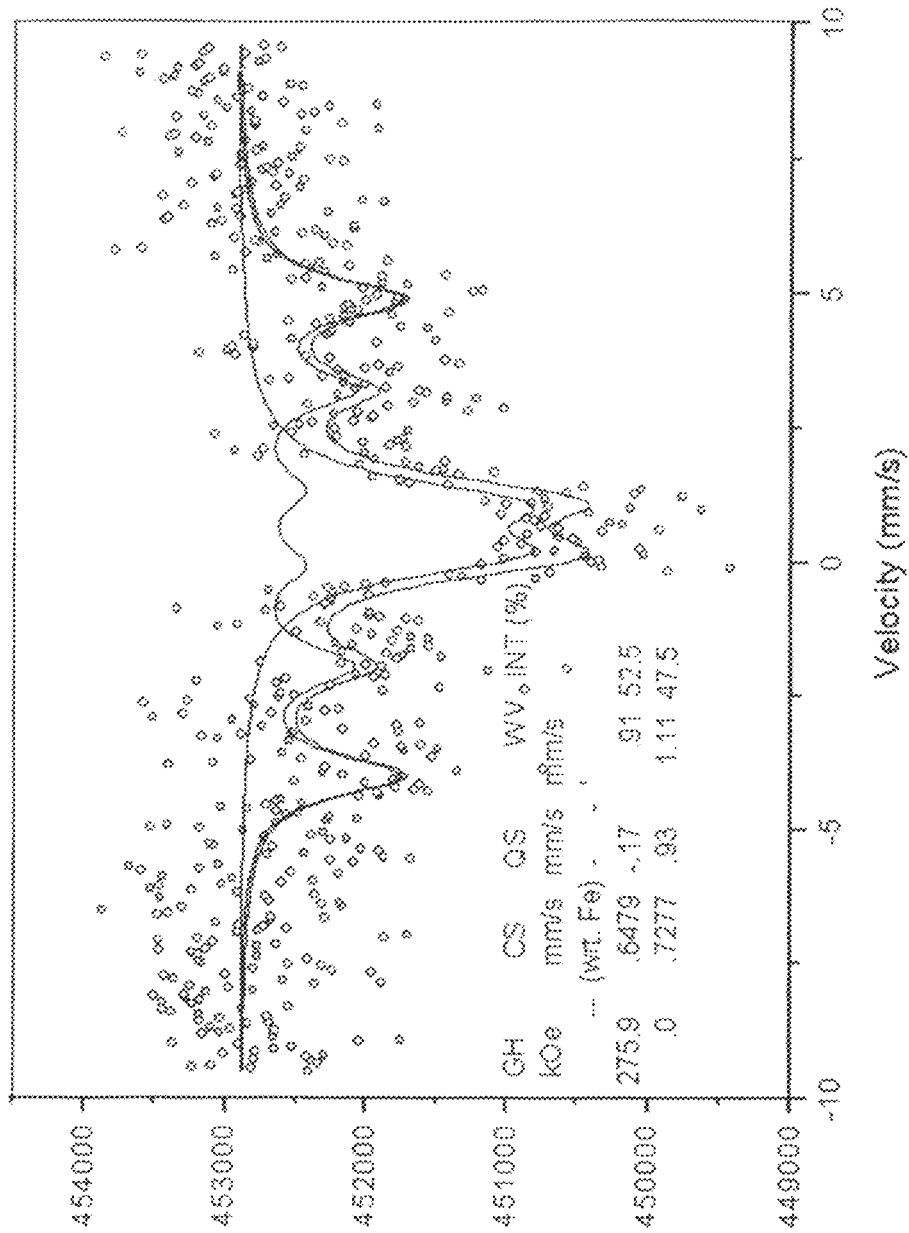
FIG. 2 shows an example of the results of Mossbauer spectroscopy carried out on a magnetic metal powder according to the present invention.

Rather than transforming synthesized FePt nanoparticles to fct structure by heat treatment as is in done in References 1-3, a goal was set to produce FePt nanoparticles that had an fct structure from the time they were synthesized. To this end, an attempt was made to synthesize FePt nanoparticles by using a polyalcohol of the highest possible boiling point as reducing agent. As a result, it was found that when a polyalcohol having a boiling point of 270° C. or higher is used at a reaction temperature of 270° C. or higher to reduce Fe ions and Pt ions in the polyalcohol under circulation, FePt nanoparticles including fct structure are directly synthesized.

The polyalcohol is preferably triethylene glycol or tetraethylene glycol. However, the invention is not limited to use of these polyalcohols but can use any of various polyalcohols and polyalcohol derivatives having a boiling point of 270° C. or higher. Use of ethylene glycol is undesirable because of its low boiling point of 197° C. (see Comparative Example 2, for instance). The Fe ions and Pt ions in the polyalcohol are typically supplied in the form of iron (III) acetylacetonate and platinum (II) acetylacetonate.

The particulars defined by the present invention will now be explained.

Metal Components

The main components of the magnetic metal particles of the present invention, and the contents thereof, are represented by the following general formula (1):

$$[T_X M_{1-X}]_Y Z_{1-Y} \quad (1),$$

where T is one or both of Fe and Co, M is one or both of Pt and Pd, Z is at least one member selected from the group composed of Ag, Cu, Bi, Sb, Pb and Sn.

T and M are typically Fe and Pt. Although X=0.5 is ideal for forming a face-centered tetragonal structure, a 10~100% face-centered tetragonal metal structure can be obtained in the range of X of 0.3~0.7. Although the Z component can lower the crystal structure transition temperature (Tt) between fcc structure and fct structure in the case of synthesizing FePt particles by the polyol method, it need not be contained in some cases. Specifically, the optimum value of Y, although differing depending on the type of Z, falls in the range of 0.7~1.0. A value of Y of less than 0.7 is undesirable because the resulting presence of excessive Z sharply depresses magnetic characteristics by hindering the emergence of fct structure. Analysis of the composition of the magnetic metal particles according to the present invention can be carried out by EDX (energy dispersive X-ray) measurement. Although the magnetic metal powder is ideally made up of metal particles having the composition represented by Equation (1), presence of impurities unavoidably incorporated in the course of production can be tolerated.

In light of the fact that, as explained in the foregoing, the composition of the magnetic metal particles according to the present invention is typically FePt, the ensuing explanation will be made using FePt particles as an example. In this specification, the term "FePt particles" is, by definition, to be construed as referring to magnetic metal particles represented by Equation (1).

Face-Centered Tetragonal Structure Ratio

The FePt particle powder according to the present invention has a volumetric ratio of ferromagnetic structure (face-centered tetragonal ratio) as measured by Mossbauer spectroscopy in the range of 10~100%. The breakdown of metallic phases (the relative amounts of different crystal structures) present in a metallographic structure is generally determined by comparing X-ray diffraction peak intensities. However, it is difficult to quantify the metallic phases of the invention FePt alloy from these peaks only, because the X-ray diffraction patterns of the fcc (face-centered cubic) structure and the fct (face-centered tetragonal) structure are nearly identical and the intensities of the (001) and (110) reflections obtained only from the fct structure are very weak.

However, it is possible to calculate the volumetric ratio of the fct structure by analyzing the volumetric ratio of the ferromagnetic structure measured with respect to the FePt alloy by Mossbauer spectroscopy. In this invention, therefore, the volumetric ratio of the fct structure of the FePt particles is determined by analyzing the volumetric ratio of the ferromagnetic structure determined by Mossbauer spectroscopic measurement of Fe atoms, i.e., by calculating the ratio of the number of Fe atoms determined to be under magnetic order by Mossbauer spectroscopy measurement of Fe atoms, and the so-obtained ratio is defined as the volumetric ratio or the fct structure.

When the volumetric ratio (vol. %) of the fct structure, i.e., the face-centered tetragonal structure, is less than 10 vol. %, the magnetic anisotropy is small and the coercivity and thermal stability required by a magnetic recording material cannot be obtained. When the magnetic anisotropy is too large, the resulting excessively high coercivity makes the product difficult to use as a material for a magnetic recording medium and rather makes it suitable for use as a material for strong permanent magnets. The ratio of the face-centered tetragonal (fct) structure of the invention magnetic metal particles is therefore defined as 10~100%.

Grain Diameter

The FePt particle powder according to the present invention has an average primary particle diameter by transmission electron microscopic observation (TEM) of 30 nm or less, preferably 20 nm or less, more preferably 10 nm or less. A primary particle is defined as the smallest unit particle incapable of further division. At the time of synthesis, the fct structure FePt particle powder synthesized in accordance with the present invention generally has present therein clusters consisting of many primary particles that form owing to the static magnetic field acting among the primary particles. In other words, the primary particles tend to collect into clusters so that a state in which numerous clusters are distributed throughout the powder is likely to occur. Such a cluster formed of numerous primary particles is called a secondary particle. Although the grain diameter of the secondary particles differs considerably depending on the conditions of the synthesis reaction, it is about 100 μm in the Examples set out below. At any rate, irrespective of whether or not such secondary particles form, the powder nevertheless has fluidity as a whole.

Magnetic Characteristics

Since the FePt particle powder according to the present invention has fct structure from the time of synthesis (without being subjected to heat treatment), it exhibits a magnetic anisotropy Hk by magnetic torque measurement of 10 kOe or greater, more preferably 12.4 kOe or greater. Magnetic anisotropy Hk is a magnetic property directly related to anisotropy constant Ku, as shown by Equation (2), in which Ms represents saturation magnetization (emu/g):

$$Hk=2Ku/Ms \qquad (2)$$

Thermal stability factor can be calculated from the anisotropy constant Ku using Equation (3):

$$\text{Thermal Stability Factor}=KuV/\kappa T \qquad (3),$$

where V is particle volume, κ is Boltzmanm constant and T is temperature. The thermal stability factor is an index of magnetic recording medium thermal stability. A magnetic metal powder having a thermal stability factor value of less than 60 is said to be unsuitable for practical use (Y. Hosoe et al, Journal of Magnetics Society of Japan, vol. 22, No. 12, 1998).

When the thermal stability factor is small, recorded signals vanish spontaneously. In order to achieve high recording density, since it is important for this that the magnetic particles to be sufficiently small relative to the recording wavelength, volume V in Equation 3 must be made considerably small. From this it follows that for making the thermal stability factor large it is necessary to make the anisotropy constant Ku large. For Ku to be large, it is important in light of Equation (2) for the magnetic anisotropy Hk and saturation magnetization Ms to be large, and an actual magnetic recording magnetic powder preferably has a magnetic anisotropy Hk at room temperature of 10 kOe or greater and a saturation magnetization σs at room temperature of 20 emu/g or greater. This is because at Hk of less than 10 kOe and σs of less than 20 emu/g the thermal stability of the magnetic particles is so markedly poor as to make the magnetic metal powder unstable for magnetic recording applications. The FePt particle powder according to the present invention exhibits a magnetic anisotropy Hk at room temperature of 10 kOe or greater and a saturation magnetization σs at room temperature of 20 emu/g or greater. As its magnetic particles are therefore excellent in thermal stability, it is suitable as a magnetic powder for use in magnetic recording media.

The FePt particles of the powder at the time of synthesis may become interconnected owing to the action of the static magnetic field, and when this happens, the resulting overall band-like morphology exhibits shape magnetic anisotropy. When coercivity is measured, therefore, it is possible that the measurement will include not only the coercivity owing to the crystal magnetic anisotropy of the FePt particles but also the coercivity owing to this shape anisotropy. The coercivity measured when the particles are separated from one another, i.e., when they are fixed at spaced apart locations, is the true coercivity of the FePt particles having fct structure according to the present invention.

Crystal Structure Transition Starting Temperature

The FePt particle powder according to the present invention is composed of 10~100 vol. % of fct structure and the remainder of fcc structure. The transition starting temperature for transforming the remaining fcc structure to fct structure is lower than the transition starting temperature (450° C.) for transforming completely fcc structure FePt particles to fct structure as in References 1 and 2. In Example 1 set out later, no transition starting temperature was observed because the structure of the magnetic metal powder was almost totally accounted for by fct structure. The transition starting temperature can be ascertained from the exothermic peak measured using a differential scanning calorimeter.

Production Method

In conventional FePt particles production methods (such as described in References 1 and 2), the obtained FePt particles have fcc (face-centered cubic) structure, which is a disordered phase. In order to transform their phase to $L1_0$ orderly phase (fct structure) manifesting ferromagnetism they have to be heat treated at a temperature equal to or higher than the crystal structure transition starting temperature (Tt) (450° C.). These conventional methods utilize thermal decomposition of iron pentacarbonyl and metal ion reduction reaction by the strong reducing power of boron hydride. As such, they can be called production methods using fast reactions.

On the other hand, the inventor first learned that when both Fe and Pt are reduced from acetylacetonate complex by polyol, by a method in which the reaction speed is suppressed, it becomes possible to lower the FePt particle crystal structure transition starting temperature (Tt) to around 310° C. The polyol they used at this stage of their research was ethylene glycol (boiling point: 197.6° C.) and the reaction temperature was 200° C. This case is set out below in Comparative Example 2.

Between Fe and Pt, Pt is the easier to reduce. Therefore, component segregation can be expected to occur inside the particles when the reaction speed of the production method is high. In this case, the heat treatment for transformation to the $L1_0$ ordered phase must be carried out so as to diffuse Fe and Pt mutually in the particles. Tt therefore becomes a high temperature of 450° C. or higher. In contrast, when the reaction speed is slowed down, component segregation does not readily occur in the particles, so that Tt can be lowered. The use of a Tt of 280° C. in Comparative Example 2 can be considered to be for this reason. However, the product of Comparative Example 2 has a low magnetic anisotropy Hk of 3.7 kOe by magnetic torque measurement and, in its state as synthesized, can be assumed to have only a very small amount of fct structure exhibiting magnetic anisotropy present. As such, it does not achieve the object of the invention set out earlier.

It was then discovered that when the reaction temperature was raised by using a polyol having a higher boiling point than ethylene glycol, such as triethylene glycol or tetraethylene glycol, a FePt particle powder can be obtained that is rich in fct structure at the time of synthesis. It was further found regarding the relationship between highest temperature reached by the solution (solvent) during the FePt particle synthesis reaction and the magnetic anisotropy Hk that it is impossible to satisfy the condition of $Hk \geq 10.0$ kOe when the highest temperature of the solvent is lower than 270° C.

Thus the inventor finding was that in a reduced reaction speed method of reducing both Fe and Pt from acetylacetonate complexes using polyol, if a solvent consisting of a polyalcohol or a derivative of a polyalcohol and having a boiling point of 270° C. or higher is used as the polyol and FePt particles are synthesized from the complexes by polyol reduction at a temperature of 270° C., a FePt particle powder possessing fluidity can be synthesized that in its state as synthesized has a volumetric ratio of ferromagnetic structure (face-centered tetragonal ratio) as measured by Mossbauer spectroscopy in the range of 10~100%, saturation magnetization as of 20 emu/g or greater, and average primary particle diameter by transmission electron microscopic (TEM) observation of 30 nm or less. The boiling point of triethylene glycol and tetraethylene glycol is not lower than 270° C. Therefore, by using a solution containing these as solvent and making the highest temperature of the solvent 270° C. or higher, FePt particles according to the present invention can be advantageously produced.

A dispersant can be incorporated in the reaction solution during the synthesis reaction. The dispersant adheres to the particle surfaces and helps to suppress aggregation among the particles. In addition, the grain diameter of the synthesized FePt particles can be controlled by suitably selecting the type and amount of the added dispersant. Dispersants suitable for use are ones that easily adhere to the metal particle surfaces. These include surface active agents with a radical including N atoms, specifically an amine, amide or azo radical, or an organic molecule including either a thiol radical or a carboxyl radical in its structure.

As explained earlier, it is important to control the speed of this synthesis reaction. Also important is for the method used for this to also control the metal concentration in the solvent. Specifically, supersaturation of the produced metal can be lowered by suppressing the concentration of metal raw material, thereby reducing the rate of nucleus generation and particle growth. If the mole ratio of all metal ions contained in the polyol and the metal salts, i.e., the mole ratio polyol/total metal ions, is 1000 or greater, the FePt particles according the present invention can be advantageously produced.

The magnetic anisotropy Hk of the FePt particles obtained by this synthesis reaction also varies with reaction time. Hk generally increases with increasing reaction time. Therefore, so as to obtain an adequately large Hk, the reaction time is set at 1 hr or more, preferably 2 hr or more, more preferably 3.5 hr or more.

The present invention will now be explained further with reference to working examples and comparative examples.

EXAMPLE

Example 1

Iron (III) acetylacetonate and platinum (II) acetylacetonate were added to and dissolved in 100 mL of tetraethylene (boiling point: 327° C.) in an amount of 1.3 mmole/L each. The solution was transferred to a vessel equipped with a circulator. The vessel was placed on an oil-bath and the solution was heated under stirring at 160 rpm while nitrogen gas was being blown into the vessel as inert gas at a flow rate of 400 mL/min. Circulation was continued for 3.5 hr at a temperature of 320° C., at which time the reaction was terminated. The solution after termination of the reaction was added with three-fold amount of methanol and centrifuged. After removal of the supernatant liquid, the residual (particulate powder) was added with 100 mL of methanol and charged into an ultrasonic washing vat. Following dispersion of the particulate powder in the ultrasonic washing vat, the dispersed liquid was centrifuged and the supernatant liquid was removed. The obtained residual (particulate powder) was thereafter subjected to two more cycles of the same washing operation consisting of methanol addition, dispersion in the ultrasonic washing vat and centrifugation. The substance containing FePt nanoparticle powder obtained after final removal of supernatant liquid was subjected to the following tests.

FIG. 1 shows transmission electron micrographs of the obtained FePt nanoparticle powder. As can be seen from micrograph (A) in FIG. 1, the average grain diameter of the primary particles as measured from this micrograph was about 5 nm. Further, as can be seen from micrograph (B), the primary particles having an average grain diameter of 5 nm gathered from place to place to form large clusters. Each of these clusters constitutes a single secondary particle. (The average grain diameter of the secondary particle at the location where the micrograph was taken was about 100 nm.) The powder composed of these secondary particles had fluidity as a whole.

The composition of the FePt nanoparticle powder was analyzed using an energy dispersive X-ray spectrometer (TMR-EDX) and found to have an atomic ratio of Fe to Pt of 59:41. The FePt nanoparticle powder was further subjected to Mossbauer spectroscopy. The result obtained is shown in FIG. 2. As can be seen from FIG. 2, a spectrum corresponding to the ferromagnetism order of $L1_0$ ordered phase was observed at room temperature and the proportion of the $L1_0$ ordered phase obtained by fitting (the volumetric ratio of the ferromagnetic structure, i.e., the face-centered tetragonal structure ratio) was 52 vol. %.

Figure 3:
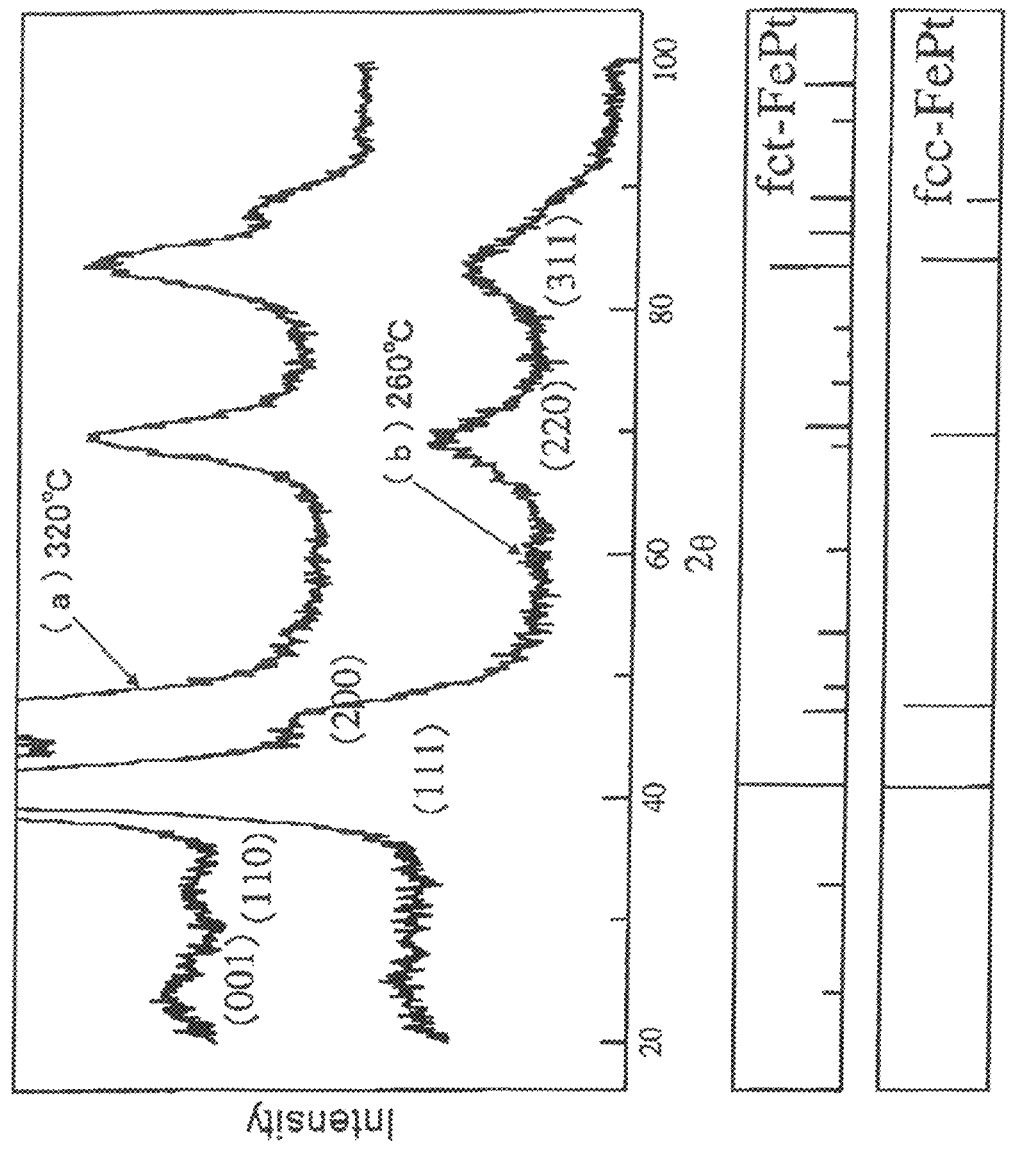
FIG. 3 shows a comparison of X-ray diffraction charts obtained for a magnetic metal powder according to the present invention and a magnetic metal powder of a comparative example.

The pattern obtained when the FePt nanoparticle powder was subjected to X-ray diffraction (XRD) is designated (a) in FIG. 3. The diffraction peaks corresponding to superlattice reflections (001) and (110) seen in pattern (a) are clear evidence of the presence of face-centered tetragonal structure.

Magnetic torque measurement carried out on the FePt nanoparticle powder showed it to have a magnetic anisotropy Hk of 31 kOe. An attempt was made to measure the transition starting temperature of the FePt nanoparticle powder using a differential scanning calorimeter (DSC) but no distinct transition temperature was observed. This is thought to be because fct formation had already progressed to a considerable extent.

The saturation magnetization σs of the FePt nanoparticle powder measured in a magnetic field of 5β using a SQUID magnetometer was 52 emu/g.

Comparative Example 1

Example 1 was repeated, except that the circulation was continued for 3.5 hr at a temperature of 260° C. As in Example 1, the obtained FePt nanoparticle powder was subjected to TEM observation, composition analysis by TMR (transversal microradiography), Mossbauer spectroscopy, X-ray diffraction, magnetic torque measurement and DSC measurement.

The average grain diameter of the primary particles determined by TEM observation was 5.4 nm and the powder was found by TMR composition analysis to be composed of FePt nanoparticles of an atomic ratio of Fe to Pt of 58:42. However, as can be seen from the results of Mossbauer spectroscopy shown in FIG. 4, no spectrum corresponding to the ferromagnetism order of $L1_0$ ordered phase was observed at room temperature. From this it can be assumed that the proportion of the FePt nanoparticles accounted for by $L1_0$ ordered phase was 0 vol. %. And, in fact, as can be seen from pattern (b) in FIG. 3, X-ray diffraction analysis revealed no peaks corresponding to superlattice reflections (001) and (110), while a distinct transition temperature was observed by DSC. The transition starting temperature was 280° C. Magnetic anisotropy Hk by magnetic torque measurement was 3.7 kOe and saturation magnetization σs was 16 emu/g.

Comparative Example 2

Example 1 was repeated, except that ethylene glycol (boiling point: 197.6° C.) was used instead of tetraethylene glycol and the circulation was continued for 3.5 hr at a temperature of 200° C. As in Example 1, the obtained FePt nanoparticle powder was subjected to TEM observation, composition analysis by TMR, Mossbauer spectroscopy, X-ray diffraction, magnetic torque measurement and DSC measurement.

The average grain diameter of the primary particles determined by TEM observation was 4 nm and the powder was found by TMR composition analysis to be composed of FePt nanoparticles of an atomic ratio of Fe to Pt of 56:44. No spectrum corresponding to the ferromagnetism order of $L1_0$ ordered phase at room temperature was observed by Mossbauer spectroscopy. From this it can be assumed that the proportion of the FePt nanoparticles accounted for by $L1_0$ ordered phase was 0 vol. %. And, in fact, X-ray diffraction analysis revealed no peaks corresponding to superlattice reflections (001) and (110). A distinct transition temperature was observed by DSC. The transition starting temperature was 310° C. Magnetic anisotropy Hk by magnetic torque measurement was 1.7 kOe and saturation magnetization σs was 5.1 emu/g.

What is claimed is:

1. A method of producing a magnetic metal powder comprising a step of producing a magnetic metal powder composed of magnetic metal particles of a substance represented by the following general formula (1):

$$[T_XM_{1-X}]_YZ_{1-Y} \tag{1},$$

where T is one or both of Fe and Co, M is one or both of Pt and Pd, Z is at least one member selected from the group composed of Ag, Cu, Bi, Sb, Pb and Sn, X represents 0.3~0.7, and Y represents 0.7~1.0, the balance being impurities unavoidably incorporated during production, in which step metal salts containing the T and M components and if required the Z component are dissolved in a solvent composed of a polyalcohol or a derivative of a polyalcohol and having a boiling point of 270° C. or higher, holding the solution at a temperature of 270° C. or higher to reduce the metal salts with the polyalcohol or polyalcohol derivative and synthesize particles of the substance by the reduction, at which time the synthesized particles, in their state as synthesized, have a volumetric ratio of ferromagnetic structure (face-centered tetragonal ratio) as measured by Mossbauer spectroscopy in the range of 10~100%, saturation magnetization σs of 20 emu/g or greater, and average primary particle diameter by transmission electron microscopic (TEM) observation of 30 nm or less.

2. A method of producing a magnetic metal powder according to claim 1, wherein the polyalcohol is one or both of triethylene glycol and tetraethylene glycol.

3. A method of producing a magnetic metal powder according to claim 1, wherein the salts of the T, M and Z components are acetylacetonates of these components.

4. A method of producing a magnetic metal powder according to claim 1, wherein the solution is held at a temperature of 270° C. or higher for a period of 1 hour or more.

5. A method of producing a magnetic metal powder according to claim 2, wherein the salts of the T, M and Z components are acetylacetonates of these components.

6. A method of producing a magnetic metal powder according to claim 2, wherein the solution is held at a temperature of 270° C. or higher for a period of 1 hour or more.

7. A method of producing a magnetic metal powder according to claim 3, wherein the solution is held at a temperature of 270° C. or higher for a period of 1 hour or more.